US012757073B2

(12) United States Patent
Srivastava et al.

(10) Patent No.: US 12,757,073 B2
(45) Date of Patent: Oct. 6, 2026

(54) SYSTEM AND METHOD FOR SELECTIVELY INCREASING THE RELIABILITY OF SELECT PACKETS IN A DATA NETWORK

(71) Applicant: Cisco Technology, Inc., San Jose, CA (US)

(72) Inventors: Vimal Srivastava, Bangalore (IN); Sri Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 495 days.

(21) Appl. No.: 18/183,400

(22) Filed: Mar. 14, 2023

(65) Prior Publication Data

US 2024/0172046 A1 May 23, 2024

(30) Foreign Application Priority Data

Nov. 23, 2022 (IN) ............................. 202241067191

(51) Int. Cl.
*H04W 28/08* (2023.01)
*H04L 1/22* (2006.01)
*H04L 5/00* (2006.01)
*H04L 47/24* (2022.01)
*H04L 69/22* (2022.01)

(52) U.S. Cl.
CPC ....... *H04W 28/0925* (2020.05); *H04L 5/0055* (2013.01); *H04L 47/24* (2013.01); *H04L 69/22* (2013.01); *H04L 1/22* (2013.01)

(58) Field of Classification Search
None
See application file for complete search history.

(56) References Cited

U.S. PATENT DOCUMENTS

| | | | | |
|---|---|---|---|---|
| 2019/0028920 | A1* | 1/2019 | Pan | H04L 47/24 |
| 2020/0100117 | A1* | 3/2020 | Hassan Hussein | H04B 17/354 |
| 2021/0243784 | A1* | 8/2021 | Goto | H04W 72/21 |
| 2021/0352525 | A1* | 11/2021 | Hong | H04L 1/1614 |
| 2023/0019215 | A1* | 1/2023 | Wang | H04L 12/1407 |
| 2024/0188111 | A1* | 6/2024 | Dudda | H04L 1/1816 |
| 2025/0119785 | A1* | 4/2025 | Rao | H04W 28/0236 |
| 2025/0168260 | A1* | 5/2025 | Yang | H04W 28/02 |
| 2025/0176056 | A1* | 5/2025 | Talebi Fard | H04L 45/74 |

* cited by examiner

*Primary Examiner* — Gregory B Sefcheck
*Assistant Examiner* — Benjamin Peter Welte
(74) *Attorney, Agent, or Firm* — Polsinelli P.C.

(57) ABSTRACT

A system and method are provided to selectively increase the reliability for transmission of select data packets that are determined to be important or critical. When the data packets are PDUs arranged in PDU-SETs, a user plane function (UPF) receives the PDU-SETs from a content server, and, based on header information, e.g., the UPF filters the PDU-SETs according to respective reliability levels. For PDU-SETs in the highest reliability level, a manner of transmitting the PDU-SETs is modified to increase reliability of the transmission for at least part of the transmission path. For example, the redundancy of the PDUs in the PDU-SETs can be increased for one or more legs of the transmission path by generating duplicates of the PDUs, which are transmitted together with the original PDUs. Further, reliability can be increased for respective legs by transmitting the PDUs using an acknowledgement mode.

20 Claims, 12 Drawing Sheets

METHOD 200 CONTINUED AT STEP 218 ON FIG. 3B

METHOD 200 CONTINUED FROM STEP 216 ON FIG. 3A

METHOD 400 CONTINUED AT STEP 418 ON FIG. 5B

METHOD 400 CONTINUED FROM STEP 416 ON FIG. 5A

SYSTEM AND METHOD FOR SELECTIVELY INCREASING THE RELIABILITY OF SELECT PACKETS IN A DATA NETWORK

CROSS-REFERENCE TO RELATED APPLICATIONS

This application claims priority to Indian application number 202241067191, filed on Nov. 23, 2022, which is expressly incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Extended reality (XR) is a study item in the 3rd Generation Partnership Project (3GPP). An aspect of this study is bringing media frame awareness into the network. Also being studied is a concept of a PDU-SET. The PDU-SET includes one or more protocol data units (PDUs) carrying the payload of one unit of information generated at the application level (e.g., a frame or video slice for extended relationship management (XRM) services). The meta-data from the media packets (e.g., RTP, NAL headers) is used for binding frames to a PDU-SET as well as a definition for new QoS attributes like a PDU-SET Delay budget.

The PDU-SET concept is used to identify a group of packets which have dependency and/or a closer relationship. Within the service data flow, there could be several types of traffic data, e.g., video frame data, audio data, haptic data, etc. For each kind of traffic data, the handling requirements may be different. For the audio data, one PDU-SET could include several or all the packets of the audio data. For the video data, one PDU-SET could include one I frame and the P frames based on this I frame. For the video data, an implementation of PDU-SET may be that the packets of one I frame could form one PDU-SET, and the packets of one P frame could form one PDU-SET. Each of the I frame or P frame could form different PDU-SETs.

If there are more than one type of PDU-SET within the service data flow, each PDU-SET can belong to a respective type of PDU-SET. Other parameters may also be added in the GTP-U header to express the dependence or importance of information of the PDUs inter or intra the PDU-SET.

Although the meta-data from data packets enables the binding of PDU-SETs as well as for new QoS attributes such as PDU Set Delay budget, the study of XR and PDU-SETs does not provide reliability features of the network that are activated based on the importance of the frame and in relation to other frames. Accordingly, improved functionality is desired to selectively provide increased reliability for select PDU-SETs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
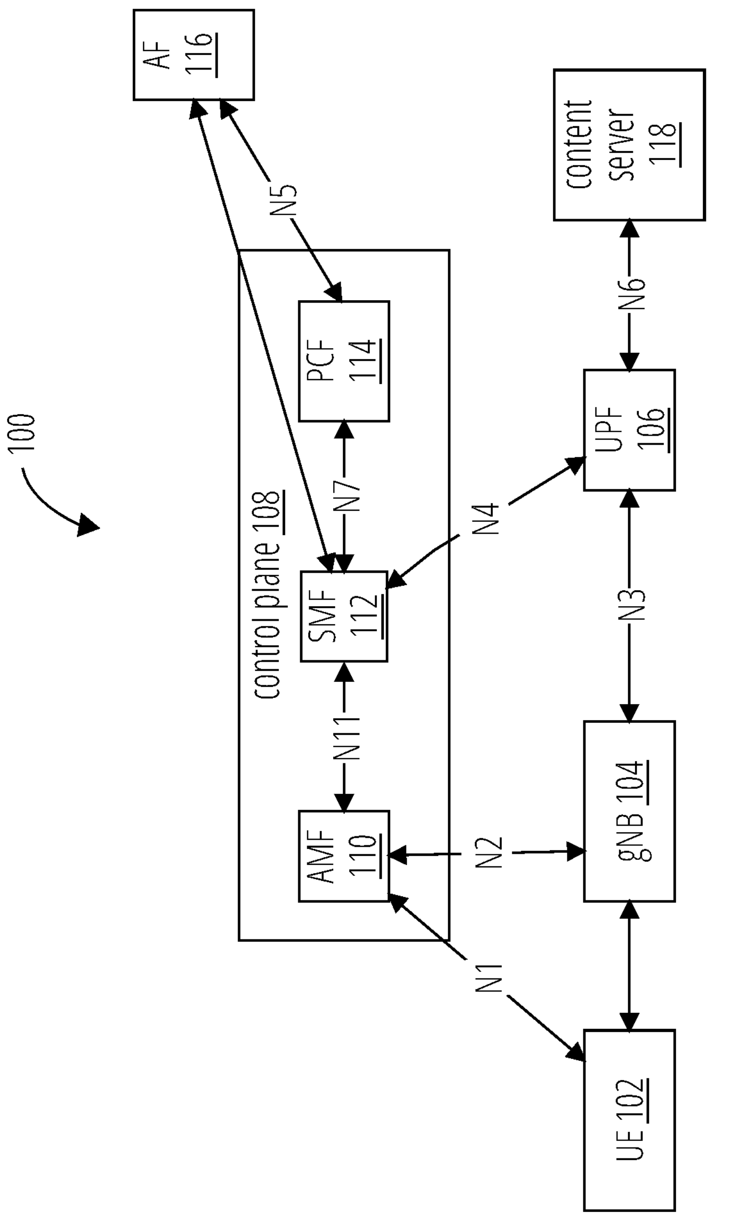
FIG. 1A illustrates an example of a data network, in accordance with one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In one aspect, a method includes receiving, at a user plane function (UPF), a protocol data unit set (PDU-SET) that includes protocol data units (PDUs) and an indicator of an importance of the PDU-SET, where the UPF is configured to store a PDU-SET filter, applying the PDU-SET filter to the PDU-SET to determine a reliability level for transmitting the PDU-SET based on the indicator of the importance of the PDU-SET, when the determined reliability level is a first predefined level, modifying how the PDU-SET is transmitted along a given portion of a transmission path from the UPF to a user equipment (UE) to increase a reliability for the transmission of the PDUs of the PDU-SET along the given portion, and when the determined reliability level is not the first predefined level, maintaining unmodified the given portion of the transmission path for the transmission of the PDUs of the PDU-SET along the given portion.

In another aspect, when the determined reliability level is the first predefined level, increasing the reliability for the transmission of the PDUs of the PDU-SET along the given portion includes using an acknowledgement mode when transmitting the PDUs of the PDU-SET from a radio access network (RAN) to the UE.

In another aspect, using the acknowledgement mode when transmitting the PDUs further includes that the acknowledgement mode is an acknowledged mode (AM) applied in a radio link control (RLC) protocol applied to transmit the PDUs from a next generation nodeB (gNB), which is the RAN, to the UE.

In another aspect, when the determined reliability level is not the first predefined level, the maintaining unmodified the given portion of the transmission path further includes transmitting the PDUs from the gNB to the UE using, in the RLC protocol, either an unacknowledged mode (UM) or a transparent mode (TM).

In another aspect, when the determined reliability level is the first predefined level, the modifying how the PDU-SET is transmitted to increase the reliability for the transmission of the PDUs further includes increasing a redundancy of the PDUs sent over the given portion of the transmission path.

In another aspect, the method further includes that when the given portion of the transmission path includes transmissions from a next generation nodeB (gNB) to the UE, the redundancy of the PDUs transmitted from the gNB to the UE is increased by: transmitting the PDUs received at the gNB from the gNB to the UE; transmitting, from the gNB to another gNB, duplicates of the PDUs received at the gNB, and transmitting the duplicates of the PDUs from the another gNB to the UE. When the determined reliability level is not the first predefined level, the PDUs of the PDU-SET are transmitted from the gNB to the UE and no duplicates of the PDUs are transmitted to the another gNB.

In another aspect, when more than one copy of the PDUs is transmitted and received for the given portion of the transmission path, duplicated copies of the received PDUs are eliminated to reduce a number of copies to one per PDU.

In another aspect, when the given portion of the transmission path includes transmissions from the UPF to a next generation nodeB (gNB), the redundancy of the PDUs sent from the UPF to the gNB is increased by: duplicating the PDUs received at the UPF, and transmitting, to the gNB, both the PDUs received at the UPF and the duplicated PDUs.

In another aspect, the method further includes registering the UE with an access and mobility management function (AMF). A PDU session is established between the UE and a session management function (SMF). Policy and charging control (PCC) rules are transmitted between the SMF and a policy control function (PCF), and the PDU-SET filters used for identifying PDU-SETs are sent from an application function (AF) to the SMF, where the PDU-SET filters include settings for identifying reliability levels assigned to respective PDU-SETs. Quality of service (QoS) policies for PDU-SETs are communicated, between AF and the PCF, that are based on the PDU-SET types of the respective PDU-SETs and are based on whether the respective PDU-SETs are enabled for ultra-reliable low latency communications (URLLC). PCC policies that are based on the QoS policies are sent from the PCF to the SMF, where the PCC policies include rules that are conditioned on the PDU-SET types of the respective PDU-SETs and on whether the respective PDU-SETs are enabled for URLLC. Modifications of the PDU-SET filters are sent from the SMF to the UPF, where the modifications depend on the received PCC policies at the SMF. The PDU-SETs sent from a content server are received at the UPF, and based on the PDU-SET filters, which of the PDU-SETs are URLLC enabled are detected.

In another aspect, marking the PDUs of the PDU-SETs that are URLLC enabled with a reliability level is the first predefined level.

In one aspect, a computing system includes one or more processors. The computing system also includes a memory storing instructions that, when executed by the one or more processors, cause the one or more processors to receive, at a user plane function (UPF), a protocol data unit set (PDU-SET) includes protocol data units (PDUs) and an indicator of an importance of the PDU-SET, where the UPF is configured to store a PDU-SET filter, apply the PDU-SET filter to the PDU-SET to determine a reliability level for transmitting the PDU-SET based on the indicator of the importance of the PDU-SET, when the determined reliability level is a first predefined level, modify how the PDU-SET is transmitted along a given portion of a transmission path from the UPF to a user equipment (UE) to increase reliability for the transmission of the PDUs of the PDU-SET along the given portion, and when the determined reliability level is not the first predefined level, maintain unmodified the given portion of the transmission path for the transmission of the PDUs of the PDU-SET along the given portion.

In one aspect, a network system, includes a content server configured to transmit a protocol data unit set (PDU-SET) includes protocol data units (PDUs) and an indicator of an importance of the PDU-SET, and a user plane function (UPF) configured to receive the PDU-SET from the content server, and apply a PDU-SET filter to the the PDU-SET to determine a reliability level for transmitting the PDU-SET based on the indicator of the importance of the PDU-SET. The network system also includes a user equipment configured to receive the PDU-SET after the PDU-SET is transmitted from the UPF, where, when the determined reliability level is a first predefined level, a given portion of a transmission path from the UPF to the US is modified with respect to how the PDU-SET is transmitted along the given portion the modification to the given portion increasing a reliability for the transmission of the PDUs of the PDU-SET along the given portion. The network system also includes when the determined reliability level is not the first predefined level, the transmission of the PDUs of the PDU-SET along the given portion is maintained unmodified.

EXAMPLE EMBODIMENTS

In digital communications, such as 5G wireless communications, a communications network may drop packets. For example, a communication channel may have insufficient bandwidth to transmit a required amount of throughput data. It can be challenging to know how to triage which data packets to transmit and which to drop. Nevertheless some data packets may be more important than others.

In the example of video data, I-frame data can be more important to transmit than P-frame data, which is more important than B-frame data, due to the hierarchy according to which the respective frames are decoded. As explained in more detail below, I-frames do not depend on any other frames to be decoded, whereas decoding P-frames depends on I-frames and other P-frames. For example, in some embodiments the P-frames and/or B-frames record the changes between frames, rather than the full information for each frame in order to conserve bandwidth and/or other compute resources. Generally, decoding B-frames depend on both I-frames and P-frames, but no other frames depend on B-frames. Consequently, if an I-frame is dropped instead of dropping one of the B-frames, then none of the P- and B-frames depending from the dropped I-frame can be decoded.

As illustrated in the above video-data example, information regarding the type of data in a given packet (e.g., information in the header of the data packet) can signal which packets should be kept and which packets can be dropped. This is also true for other types of network data besides video data. Although video data has various headers (e.g., frame headers, slice headers, and macroblock headers) that may encode frame-type information indicating whether a given frame is an I-, P-, or B-frame, when the video data is packetized to be sent over a network, this frame-type information is not accessible. Further, due to various standards for video encoding this frame-type information may be stored in different headers or at different locations within the headers. Thus, it is beneficial to provide information regarding the importance of various data packets that is both accessible at the level of the data packet (e.g., in an RTP header or a NAL header) and that can be applied to more types of network data than just video data.

In 3GPP, the extended reality and multimedia enhancement project (XRM) is considering meta-data exposure of media packets in which media frame awareness is brought into the network. In this context, a PDU-SET associates together Protocol Data Units (PDUs) that are carrying the payload of one unit of information generated at the application level (e.g., a frame or video slice for XRM Services). The meta-data from the media packets (e.g., RTP or NAL headers) is used for binding frames to a PDU-SET as well being used for defining new quality of service (QoS) attributes, such as a PDU Set Delay budget. This allows the network to drop certain packets when there is congestion in the Radio Access Network (RAN). Neither XRM nor 3GPP nor any other network currently provides or contemplates functionality where reliability features of the network are activated based on the importance of the frame and in relation to other frames.

The methods and apparatus disclosed herein provide functionality where reliability features of the network are activated based on the importance of the frame and in relation to other frames. For example, when a data packet is identified with a higher reliability level, the network modifies an aspect of the transmission path to the user equipment (UE) to provide increased reliability that the data packet reaches the UE. For example, in certain embodiments, this increased reliability is provided by increasing the redundancy of the data packet for one or more legs/portions of the transmission path to the UE. Additionally or alternatively, this increased reliability may be provided by using an acknowledgement mode on one or more legs/portions of the transmission path to the UE. For example, the acknowledgement mode may require ACK/NACK messages to be sent confirming whether the transmission of the data packet was successful. If unsuccessful, the data packet is resent until the receiver has successfully received the data packet.

Referring now to the drawings, wherein like reference numerals designate identical or corresponding parts throughout the several views, FIG. 1A illustrates a network 100 that includes a user equipment (UE) 102, a next generation NodeB (gNB) 104, a user plane function (UPF) 106, a control plane 108 (which includes an access and mobility management function (AMF) 110, a session management function (SMF) 112, a policy control function (PCF) 114), an application function (AF) 116, and a content server 118.

According to certain non-limiting examples, embodiments, and implementations, the network 100 can be a 5G wireless network 100 in which embodiments presented herein may be imple-mented. The network 100 may include a number of network nodes and/or entities, such as a user equipment (UE) device 102 (referred to simply as "UE" or "the UE"), e.g., a mobile telephone. The network 100 may be, for example, an enterprise private Third Generation Partnership project (3GPP) based network, such as a private Fifth Generation (5G) network for "private 5G." Such enterprise deployments may have mis-sion-critical devices, Internet of Things (IoT) devices, and/or robotics devices, where application-specific Quality of Service (QoS) treatment, low latency, and reliability are key considerations.

It will be appreciated that the network 100 typically includes multiple UE devices; however, one UE is depicted for simplicity. The UE 102 may be any suitable type of device, such as a cellular telephone, a smart phone, a tablet device, an IoT device, a Machine-to-Machine (M2M)

device, a robotics device, and a sensor, etc. UE 102 may obtain access to the private 5G network via one or more base stations, such as a gNB 104.

In the non-limiting example in FIG. 1A, the network 100 is illustrated with the gNB 104 being a next generation NodeB (gNB), but it is understood that, instead of using a gNB as the radio access network (RAN), the network 100 may be implemented using, as an RAN, one or more of an evolved universal mobile telecommunications system (UMTS) terrestrial radio gNB (E-UTRAN), a radio area network, and/or a next generation radio area network (NG-RAN) (each more generally referred to as a "RAN"). The gNB 104 may include one or more eNodeB (eNB) entities and/or one or more next generation NodeB (gNB) devices. The eNB and gNB entities (more generally referred to as a "gNB") may communicate with one another via one or more X2 (referred to as "Xn" in 5G) interfaces.

In the data plane, the network 100 also includes a UPF 106 and a content server 118. As discussed in more detail below, the data plane supports various methods for sending protocol data units (PDUs) from the content server 118 to the UE 102 to achieve ultra-reliability and low latency communication (URLLC). Some of these methods support redundant flows of traffic over portions of the transmission path m the content server 118 to the UE 102 (e.g., copies of the same PDUs are sent along various legs of the transmission path). Thus, the UE 102 or gNB 104 may receives duplicate flows of packets/PDUs, such that when packets are dropped along a given leg of the transmission path due, e.g., to network problems, the UE 102 continues to receive at least one copy of the dropped packets/PDUs, to achieve URLLC.

In additions to the data plane of the network 100 over which flows of traffic are conveyed between the UE 102 to the content server 118, the network 100 also includes a control plane 108 to manage/control the data plane. The network 100 may include one or more local area networks (LANs) and one or more wide area networks (WANs), such as the Internet.

Control planes of a control plane 108 may be utilized in the network 100 for access and mobility management, session management, and/or policy management and control for the UE 102. In particular, the control plane 108 may include an Access and Mobility Management Function (AMF) 110 and a Session Manage-ment Function (SMF) 112. The AMF 124 and SMF 126 may be implemented as separate functions or components, or alter-natively provided together as an integrated functionality (in whole or in part) and/or co-located at the same node or component. A protocol data unit (PDU) session at UPF 106 may be managed by SMF 112 over an N4 interface using a Packet Forwarding Control Protocol (PFCP), for example. In some implementations, control plane 108 is provided locally in the network 100. In other implementations, control plane 108 is provided as part of a cloud infrastruc-ture. In some implementations, the private 5G network may be configured without use of a Policy and Control Function (PCF) 114.

UE 102 may communicate with access and mobility management function (AMF) 110 via the gNB 104. The AMF 110 may communicate control signaling (e.g., non-access stratum (NAS) signaling) with UE 102 using an N1 interface. The AMF 110 may commu-nicate control signaling with the gNB using an N2 interface. The AMF 110 may facilitate communication by other network functions with UE 102 and/or the gNB 104. For example, other network functions may subscribe to notifications regarding mobility events relating to UE 102. The AMF 110 may support termination of non-access stratum (NAS) signaling, NAS ciphering and integrity protection, registration management, connection management, and/or mobility management. The AMF 110 may support access, authentication, and authorization (AAA) and/or security context management.

The AMF 110 may communicate control signaling with a session management function (SMF) 112 using an N11 interface. The SMF 112 may support session establish-ment, modification, and/or release. The SMF 112 may allocate and manage the allocation of an internet protocol (IP) address to UE 102. The SMF 112 may support dynamic host configuration protocol (DHCP) functions. The SMF 112 may support termination of NAS signaling related to session management. The SMF 112 may support traffic steering configuration for one or more user plane functions (UPFs) 106. When multiple AMFs are present, they may communicate with each other over one or more N14 interfaces.

The UPF 106 may communicate control signaling with the SMF 112 using an N4 interface. If multiple UPF entities are present, they may communicate control signaling with each other using one or more N9 interfaces. The one or more UPF 106 may commu-nicate data signaling with the gNB 104 using an N3 interface. The UPF 106 may support packet routing and forwarding, packet inspection, and han-dling of quality of service (QoS). The UPF 106 may act as an external protocol data unit (PDU) session point of interconnect to a content server 118, such as the Internet. The UPF 106 may communicate data signaling with the content server 118 using an N6 interface. The UPF 106 may serve as an anchor point for mobility within and between radio access technologies (RATs).

A policy control function (PCF) 114 may commu-nicate control signaling with the SMF 112 using an N7 interface. The PCF 114 may communicate control signaling with the AMF 110 using an N15 interface. The PCF 114 may provide policy rules to other control plane entities. The PCF 114 may provide access subscription information for policy decisions in a unified data repository, for example.

An application function (AF) 116 may communi-cate control signaling with the PCF 114 using an N5 interface. The AF 116 may support application influence on traffic routing. The AF 116 may interact with the PCF 114 to provide policy control. In the ensuing description, control signaling, data signal, and NAS signaling may be referred to more generally as "signaling."

Figure 1B:
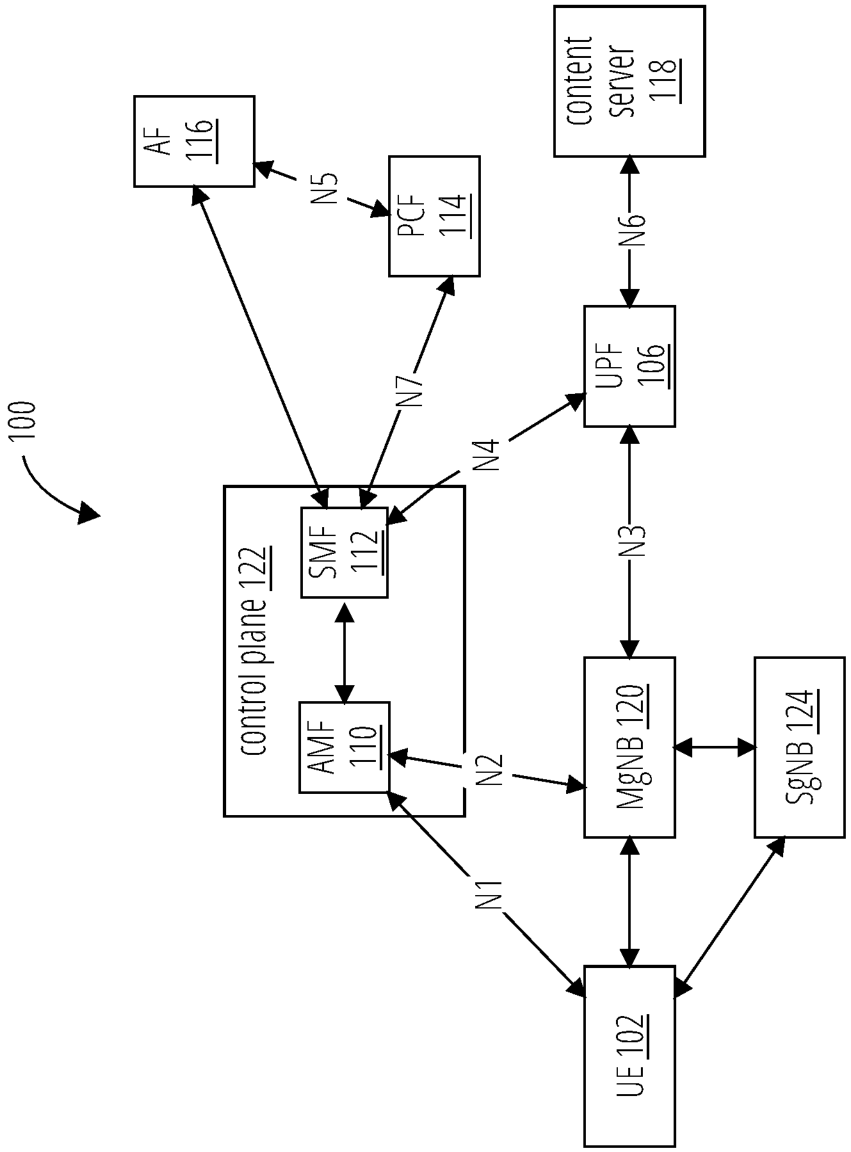
FIG. 1B illustrates an example of a data network with multiple radio access networks transmitting to a user equipment, in accordance with one embodiment.

Like in FIG. 1A, FIG. 1B illustrates a non-limiting example of the network 100. In addition to the UE 102, the UPF 106, the AMF 110, the SMF 112, a PCF 114, the AF 116, and the content server 118, the network 100 illustrated in FIG. 1B, includes two radio access networks (i.e., a first/master next generation nodeB (MgNB) 120 and a second/secondary ext generation nodeB (SgNB) 124). The MgNB 120 and the SgNB 124 have a same functionality as the gNB 104 in FIG. 1A, except there are two gNBs in FIG. 1B rather than one. This difference provides redundancy in case packets are dropped between one of the gNBs and the UE 102, to achieve URLLC.

Figure 2:
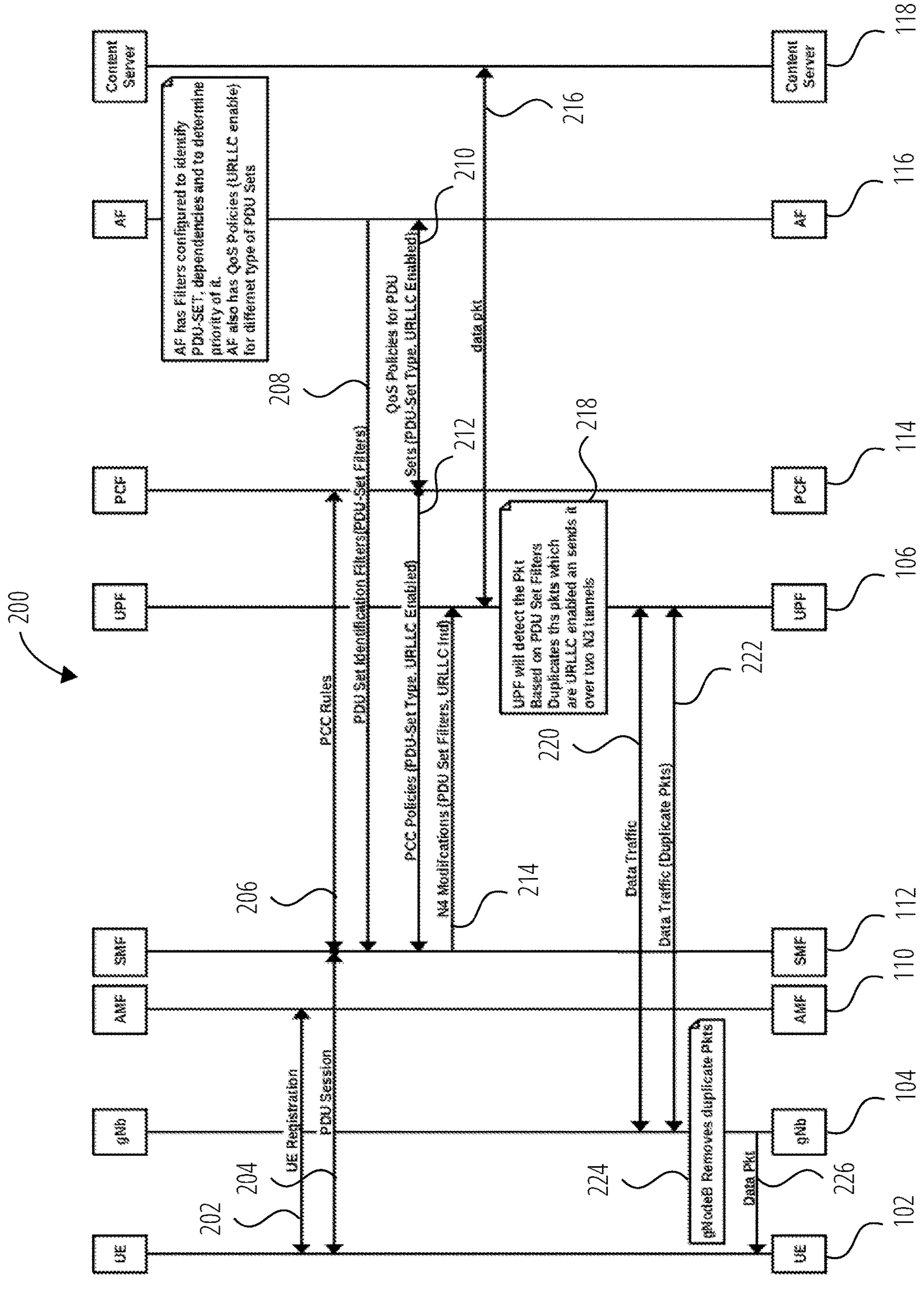
FIG. 2 illustrates an example of a call flow for method 200, in accordance with one embodiment.
Figure 3A:
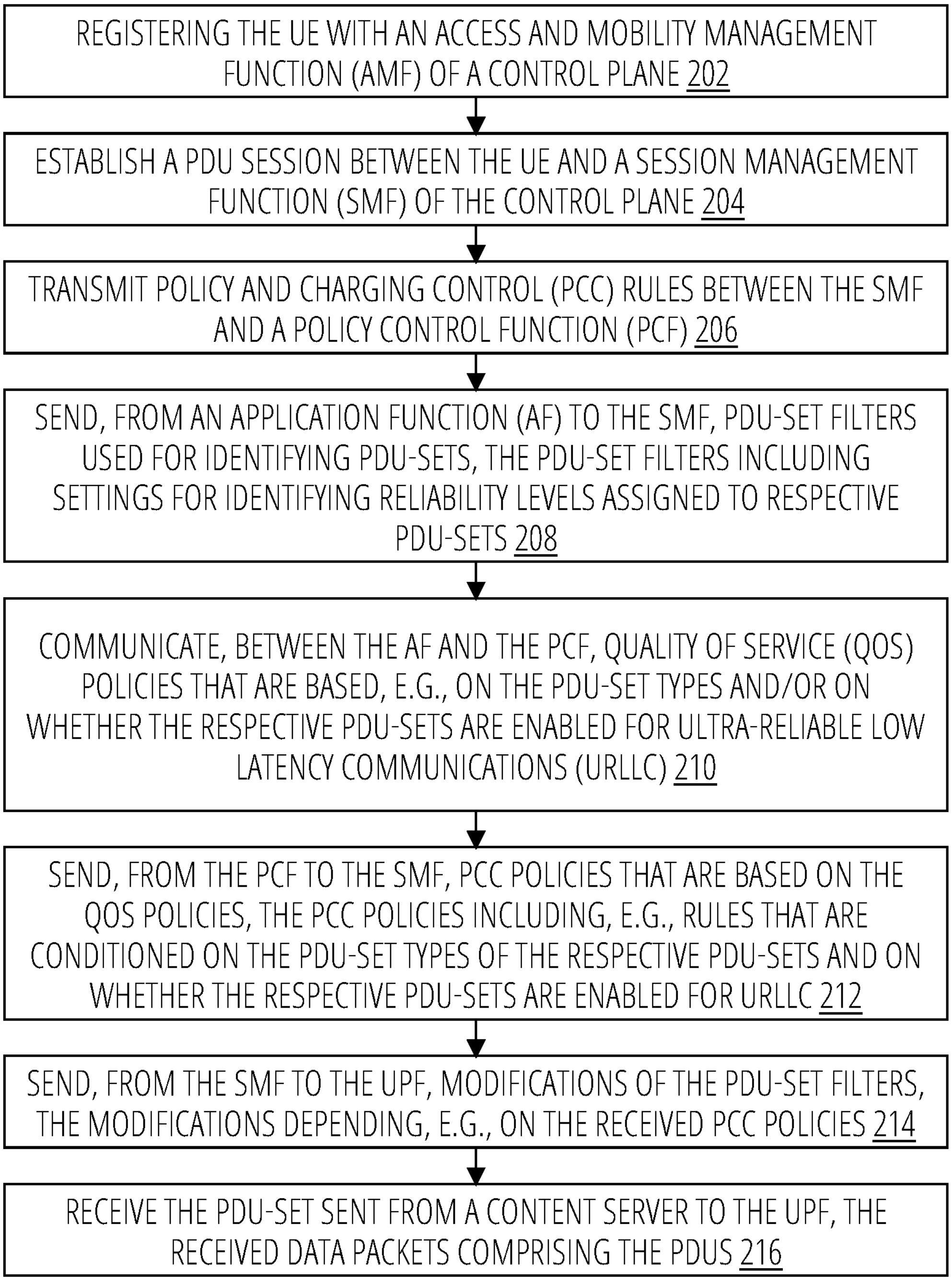
FIG. 3A illustrates an example of a flow diagram for various steps of method 200, in accordance with one embodiment.
Figure 3B:
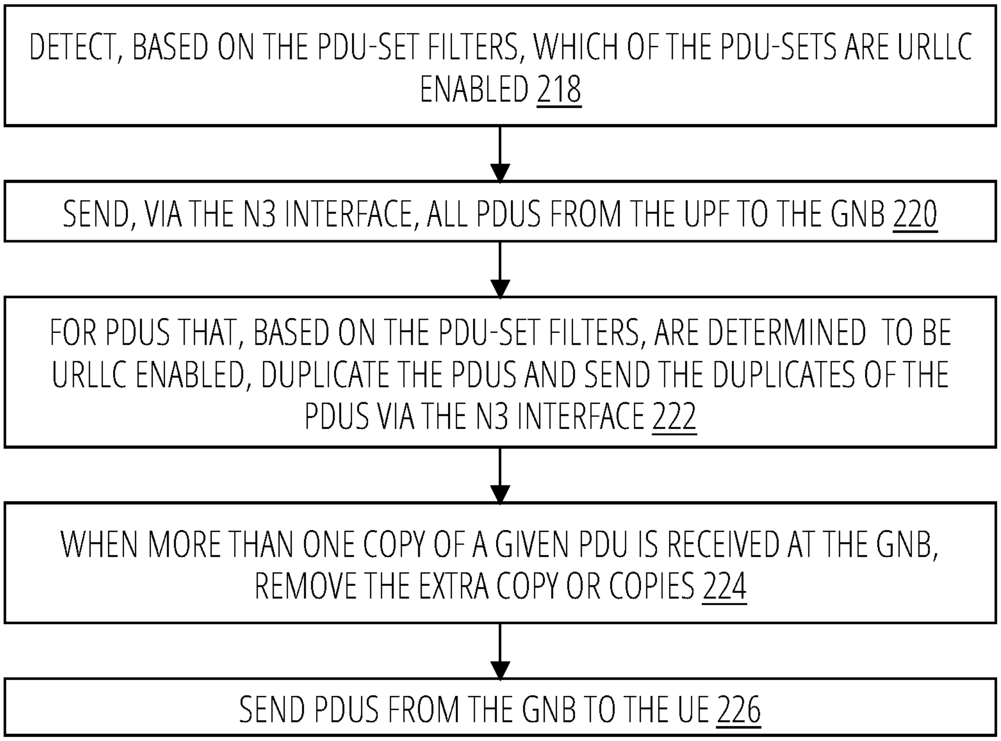
FIG. 3B illustrates an example of a flow diagram for additional steps of method 200, in accordance with one embodiment.

Method 200 is illustrated in FIGS. 2, 3A, and 3B. FIG. 2 provides a call flow representing method 200, and FIGS. 3A and 3B provide a flow diagram of method 200. In method 200, enhanced reliability is achieved for N3 transmissions by duplicating data packets that are indicated as having a higher reliability level (e.g., PDU-SETs that are indicated as being URLLC enabled). Thus, the N3 transmissions include the normal data traffic sent via step 220, and the N3 transmissions include additional data traffic in which data packets indicated as having a higher reliability level (e.g., PDU-SETs that are indicated as being URLLC enabled) are duplicated and sent via step 222 to provide redundancy in case some of the data packets are dropped.

As discussed above, the transmission of video data is one non-limiting case in which different reliability levels can be assigned to different data packets. For example, video compression uses different algorithms and techniques for compression. Generally, these encoding techniques generate three different types of frames: I-frames, P-frames, and B-frames. The different characteristics of these respective frame types—in particular dependencies between the respective frames types—results in a hierarchy of importance because all other frames depend on the I-frames and no other frames depend from the B-frames. Accordingly, ensuring reliable transmission of the I-frames is most important, and reliable transmission of the B-frames is least important, with the importance of the P-frames falling between the I- and B-frames.

More specifically, I-frames are video frames that are encoded as a single image, such that it can be decoded without any dependencies on previous frames. All other frames ultimately depend from one or more I-frames. P-frames are predicative video frames that depend on a previous frame. P-frames can be used to encode other frames, including B-frames and other P-frames. B-frames are bidirectional video frames that depend on both the previous frame and the next frame. Generally, with some exceptions, no other frames depend on B-frames. Thus, the I-frame is an important frame because multiple P- and B-frames are encoded based on the I-frame, and, therefore, the decoder requires receipt of the I-frame to accurately decode all dependent P- and B-frames. The loss of an I-frame prevents the decoding of the dependent P and B frames, resulting in multiple frames of the video not being displayed and a poor user experience.

In view of the above and various use-cases related to extended reality (XR), it can be seen that there are advantages to bringing media frame awareness into the network. For example, a PDU-SET can be assigned a PDU-SET Type providing information regarding the payload. A PDU-SET includes of one or more protocol data units (PDUs) carrying the payload of one unit of information generated at the application level (e.g. a frame or video slice for XRM Services). The meta-data from the media packets (e.g., RTP, NAL headers) can be used for binding frames to the PDU-SET. Additionally, the meta-data from the media packet can be used to define new QoS attributes such as PDU Set Delay budget. This allows the network to drop certain packets when there is congestion in the radio access network (RAN).

In addition to bringing media awareness into the network, the methods disclosed herein provide the advantages that the meta-data from the media packets can be adapted and used to leverage the reliability capability of the core network. For example, the N3 interface of the network can provide support for redundant PDU sessions and N3 redundancy, as illustrated by method 200. The methods described herein also provide the benefit of leveraging the network capabilities to provide distinct traffic treatment at the level of PDU-SETs.

By way of non-limiting illustration, the methods disclosed herein advantageously enable ultra-reliability for certain frame types which other frame types depend up on, based on the feedback from the AF 116. For example, ensuring zero packet loss of I-frames, will automatically make the dependent P- and B-frames be useful at the decoder and will greatly improve the user experience.

The congestion resulting in dropped packets may occur at one more legs of the transmission path from the content server 118 to the UE 102. For example, dropped packets may occur at the N3 interface or may occur along the transmission leg between the gNB 104 and the UE 102. When the network 100 is allowed to drop certain packets due to congestion, the network 100 can monitor and determine one or more legs of the transmission path is most likely to drop packets and increase, for those one or more legs, the redundancy of packets assigned a higher reliability level (e.g., PDU-SETs that are URLLC enabled). Thus, if one of two redundant packets are lost, the remaining packet will nevertheless be decoded. Alternatively or additionally, an acknowledgement mode may be used on the one or more legs that are determined likely to drop packets. The acknowledgement mode resends the data packet until an acknowledgment (ACK) message is received, indicating that transmission of the packet was successful.

For example, when increased reliability is desired for N3, the redundancy of transmissions along N3 can be increased for URLLC enabled PDU-SETs. Method 200 describes a non-limiting example of increasing the redundancy of transmissions along N3. The network 100 illustrated in either FIG. 1A or FIG. 1B may be used to implement method 200.

Figure 4:
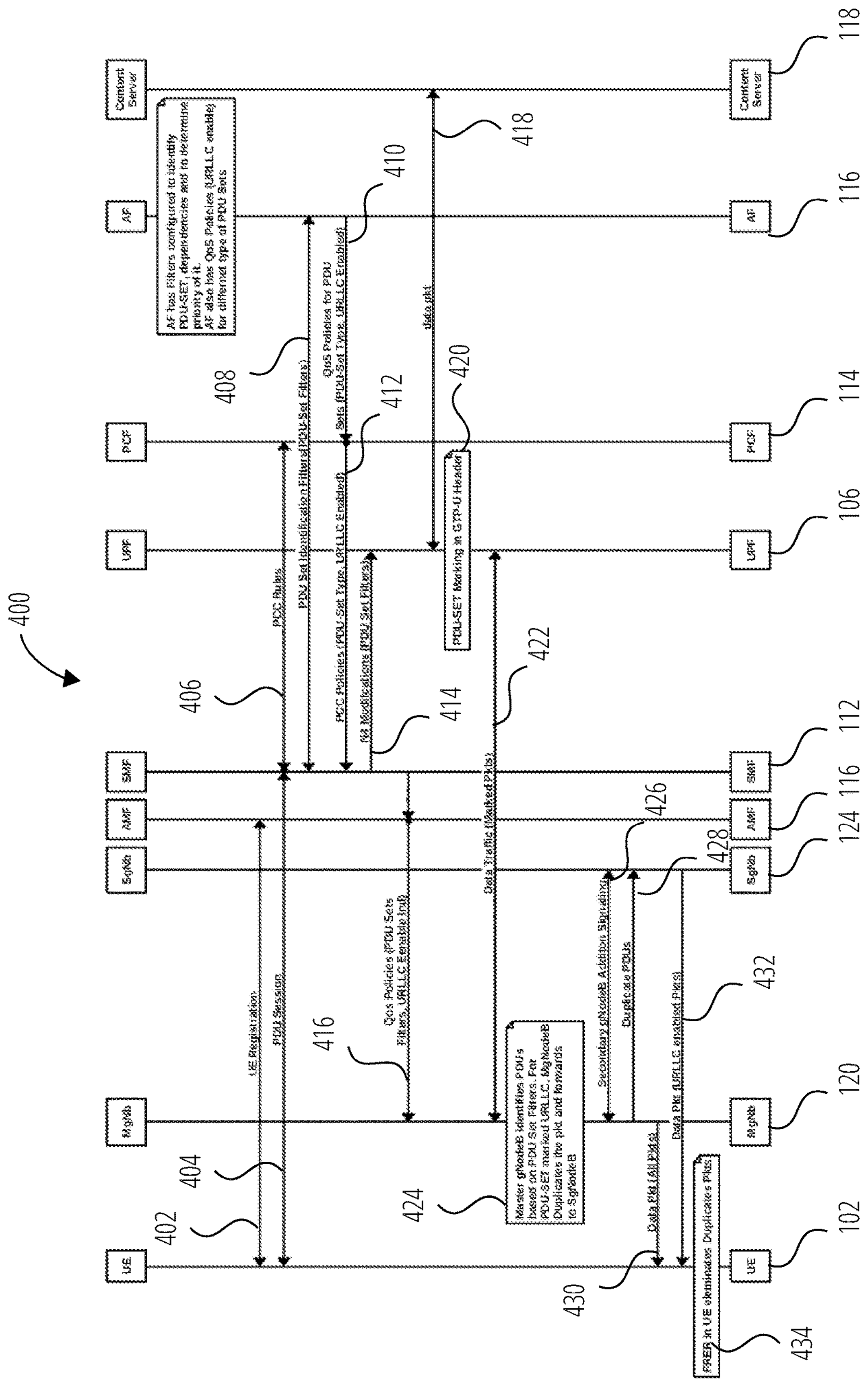
FIG. 4 illustrates an example of a call flow for method 400, in accordance with one embodiment.
Figure 5A:
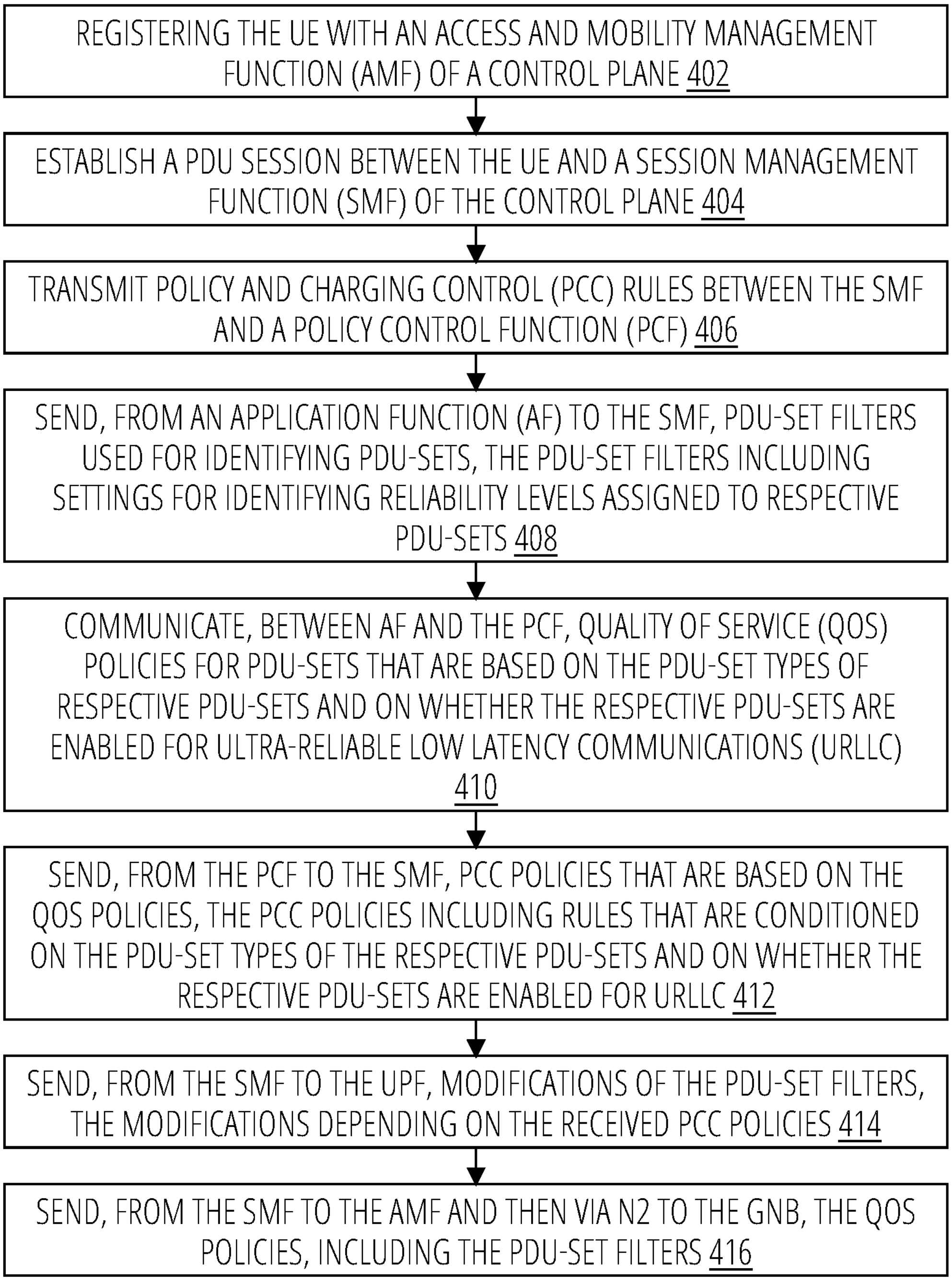
FIG. 5A illustrates an example of a flow diagram for various steps of method 400, in accordance with one embodiment.
Figure 5B:
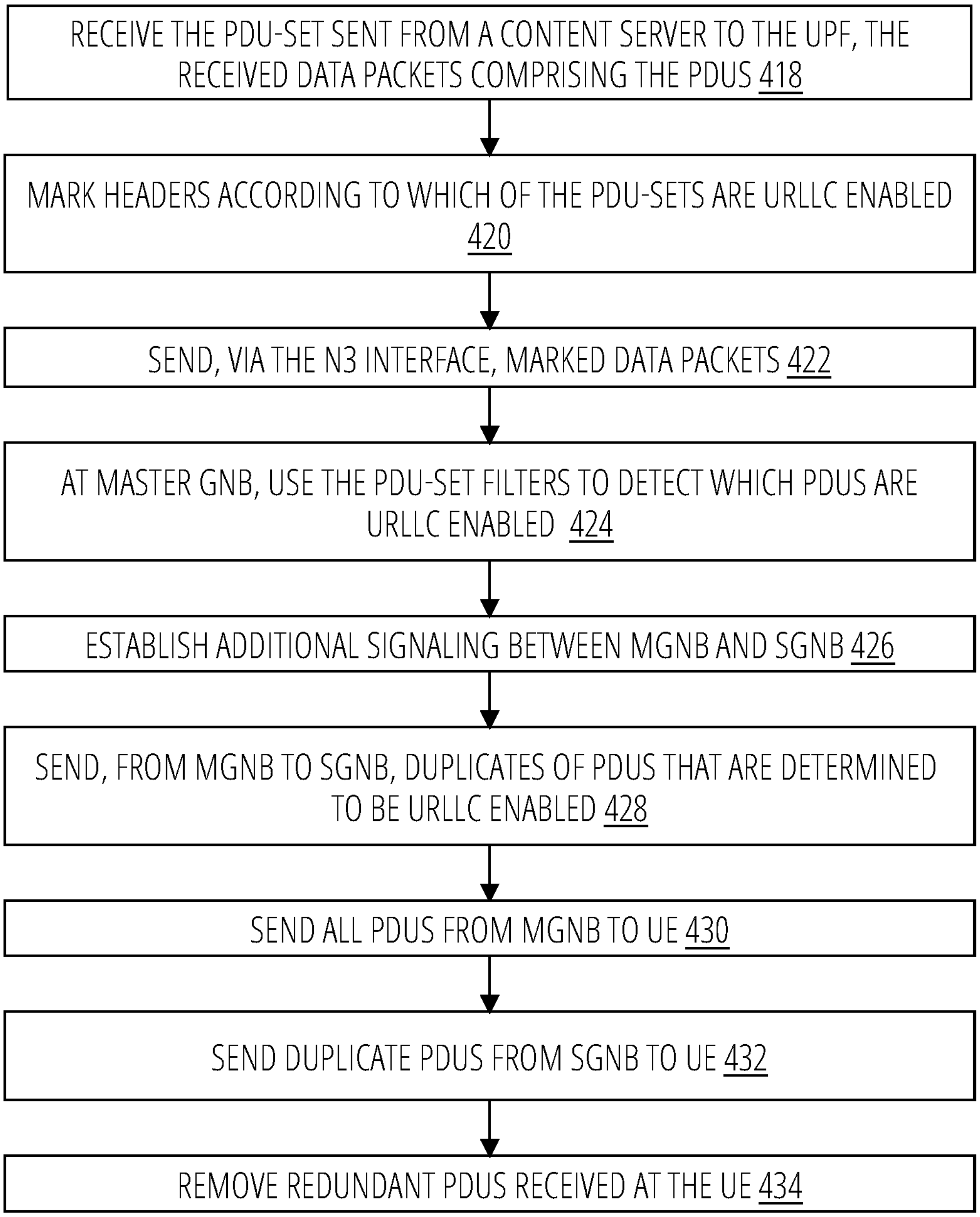
FIG. 5B illustrates an example of a flow diagram for additional steps of method 400, in accordance with one embodiment.

Method 400, which is illustrated in FIGS. 4, 5A, and 5B, provides a non-limiting example of increasing the packet redundancy for transmissions from the gNB to the UE 102. Here, for example, redundancy is increased by duplicating the PDUs of PDU-SETs that are URLLC enabled, and only the duplicated PDUs are sent to the UE from a secondary gNB (SgNB), whereas all of the PDUs (i.e., for both PDU-SETs that are URLLC enabled and PDU-SETs that are not URLLC enabled) are sent to the UE from a master gNB (MgNB). Thus, if a PDU of a URLLC enabled PDU-SET will only be lost if it is dropped in the transmissions from both the MgNB and the SgNB. The network 100 illustrated in FIG. 1B, which includes two gNBs (i.e., MgNB and SgNB), may be used to implement method 400.

Figure 6:
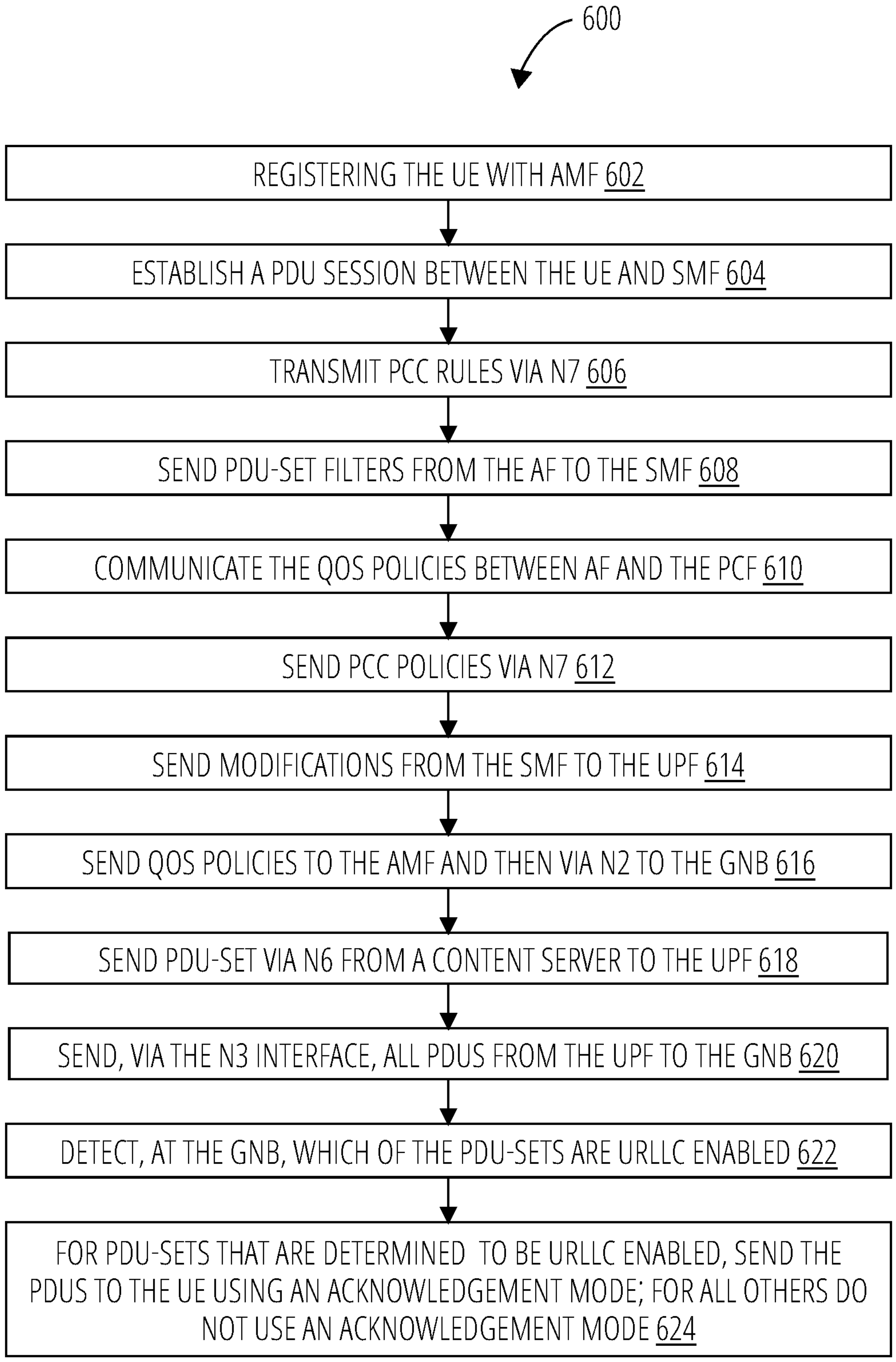
FIG. 6 illustrates an example of a flow diagram of method 600, in accordance with one embodiment.

Method 600, which is illustrated by the flow diagram in FIG. 6, provides another non-limiting example of selectively increasing for specified data packets the reliability of transmissions from the gNB to the UE 102. For example, reliability is increased by using an acknowledgement mode when sending the PDUs of PDU-SETs that are URLLC enabled. Thus, if a PDU of a URLLC enabled PDU-SET is lost, the UE will send an NACK message, indicating that the PDU should be resent. The network 100 illustrated in FIG. 1A may be used to implement method 600, for example.

The various methods (i.e., method 200, methods 400, and method 600) may be combined in complementary ways to provide increased reliability for those data packets that are indicated as benefiting from a higher reliability level. In each of these methods, the capabilities of the network 100 are leveraged to selectively provide increased reliability to select data packets. Thus, even when the network 100 is allowed to drop packets due to congestion, the most important packets can nevertheless be ensured (or are at least more likely) to be transmitted to the UE 102.

FIG. 3A illustrates an example method/routine for increasing the reliability of N3 transmissions (i.e., transmissions from the UPF 106 to the gNB 104) for certain data packets (e.g., PDU-SETs that are URLLC enabled). Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Prior to any of the steps in method 200, the AF 116 has one or more filters configured to identify sets of data packets (e.g., PDU-SETs), including filters for determining dependencies and to determine the priority and/or importance of respective data packets. The AF 116 can also be configured to include quality of service (QoS) policies for different types of data packets (e.g., for different PDU-SET Types). These QoS policies can be used to differentiate between PDU-SETs that are URLLC enabled versus those that are not.

According to some examples, the method 200 includes registering the UE 102 with an access and mobility management function (AMF) 110 of a control plane 108, at step 202.

According to some examples, the method 200 includes establishing a PDU session between the UE 102 and a session management function (SMF) 112 of the control plane 108, at step 204.

According to some examples, the method 200 includes transmitting policy and charging control (PCC) rules between the SMF and a policy control function (PCF) 114, at step 206.

According to some examples, the method 200 includes sending, from an application function (AF) 116 to the SMF 112, PDU-SET filters used for identifying PDU-SETs, at step 208. The PDU-SET filters include settings that are used for identifying reliability levels assigned to respective PDU-SETs. For example, the AF 116 can configure Identification data for the PDU-SET in the SMF 112. This identification information can be a set of filters based on RTP, NAL, and/or Extended RTP headers.

According to some examples, the method 200 includes communicating, between AF 116 and the PCF 114, quality of service (QoS) policies for PDU-SETs that are based on the PDU-SET types of respective PDU-SETs and on whether the respective PDU-SETs are enabled for ultra-reliable low latency communications (URLLC), at step 210. For example, the AF 116 can configure policies in the PCF 114 for different types of PDU-SETs. That is, based on the AF configurations (or based on local configurations) the PCF 114 will have QoS policies that enable URLLC for the PDU-SETs that have been identified as critical.

According to some examples, the method 200 includes sending, from the PCF 114 to the SMF 112, PCC policies that are based on the QoS policies, the PCC policies including rule s that are conditioned on the PDU-SET types of the respective PDU-SETs and/or on whether the respective PDU-SETs are enabled for URLLC, at step 212. For example, consistent with step 210 in which the AF 116 configures policies in the PCF 114 for different types of PDU-SETs, the PCF 114 can configure policies in the SMF as part of PDU Session establishment.

According to some examples, the method 200 includes sending, from the SMF 112 to the UPF 106, modifications of the PDU-SET filters, at step 214. These modifications can depend on the received PCC policies. For example, the SMF 112 configures the filters in the UPF 106 as part of N4 establishment/modification process. That is, the SMF 112 sends rules for packet detection rules to UPF 106.

According to some examples, the method 200 includes receiving the PDU-SET sent from a content server 118 to the UPF 106, the received data packets comprising the PDUs, at step 216.

In FIG. 3B, method 200 continues with step 218. According to some examples, the method 200 includes using the PDU-SET filters to detect which of the PDU-SETs are URLLC enabled, at step 218. For example, when a download (DL) packet is received at the UPF 106, the UPF 106 can identify the packets (e.g., PDUs) which belong to the same set (e.g., a PDU-SET). That is, upon identifying PDU-SETs as being critical (e.g., PDU-SETs indicated as being URLLC enabled by information in an RTP header), the UPF 106 can duplicate the PDUs of the identified PDU-SETs and send both the original PDUs and the duplicates of the PDUs on N3 tunnel to the gNB 104.

According to some examples, the method 200 includes sending all PDUs via the N3 interface from the UPF 106 to the gNB 104, at step 220.

According to some examples, based on the PDU-SET filters, the method 200 includes determining which data packets (e.g., PDU-SETs) are critical or otherwise merit a higher reliability level/status (e.g., which PDU-SETs are URLLC enabled). Then, for data packets that are determined to be critical (e.g., PDU-SETs that are URLLC enabled), duplicate the data packets (e.g., PDUs) and send the duplicates of the PDUs via the N3 interface, at step 222.

According to some examples, the method 200 includes when more than one copy of a given PDU is received at the gNB 104, the extra copy or copies are removed/eliminated, at step 224. For example, the gNB 104 can use the GTP sequence number to determine when more than one copy of a data packet (e.g., a PDU) has been received and then eliminate redundant copies of the data packet.

According to some examples, the method 200 includes sending PDUs from the gNB 104 to the UE 102, at step 226.

Method 400, which is illustrated in FIGS. 4, 5A, and 5B, provides a non-limiting example of increasing the packet redundancy for transmissions from the gNB to the UE 102. Here, for example, redundancy is increased by duplicating the PDUs of PDU-SETs that are URLLC enabled, and only the duplicated PDUs are sent to the UE from a secondary gNB (SgNB), whereas all of the PDUs (i.e., for both PDU-SETs that are URLLC enabled and PDU-SETs that are not URLLC enabled) are sent to the UE from a master gNB (MgNB). Thus, if a PDU of a URLLC enabled PDU-SET will only be lost if it is dropped in the transmissions from both the MgNB and the SgNB, increasing the likelihood of the PDU not being lost. The network 100 illustrated in FIG. 1B, which includes two gNBs (i.e., MgNB and SgNB), may be used to implement method 400.

FIG. 5A illustrates an example routine for increasing the packet redundancy for transmissions from one or more gNBs to the UE 102. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method 400 includes registering the UE 102 with an access and mobility management function (AMF) 110 of a control plane 108, at step 402. Step 402 can be essentially identical to step 202.

According to some examples, the method includes establishing a PDU session between the UE 102 and a session management function (SMF) 112 of the control plane 108, at step 404. Step 404 can be essentially identical to step 204.

According to some examples, the method 400 includes transmitting policy and charging control (PCC) rules between the SMF 112 and a policy control function (PCF) at step 406. Step 406 can be essentially identical to step 206.

According to some examples, the method 400 includes sending PDU-SET filters used for identifying PDU-SETs from the application function (AF) 116 to the SMF 112, at step 408. The PDU-SET filters include settings for identifying reliability levels assigned to respective PDU-SETs. Step 408 can be essentially identical to step 208.

According to some examples, at step 410, the method 400 includes communicating, between AF 116 and the PCF 114, quality of service (QoS) policies for data packets (e.g., PDU-SETs) that are based on the types of the data packets (e.g., PDU-SET types of respective PDU-SETs). For example, the QoS policies can be based on whether the respective PDU-SETs are enabled for ultra-reliable low latency communications (URLLC). Step 410 can be essentially identical to step 210. That is, the QoS policies applied by the PCF 114, which are based on AF configurations, can enable URLLC for the PDU-SETs that are identified as critical.

According to some examples, the method 400 includes sending, from the PCF to the SMF, PCC policies that are based on the QoS policies, the PCC policies including rules that are conditioned on the PDU-SET types of the respective PDU-SETs and on whether the respective PDU-SETs are enabled for URLLC, at step 412. For example, based on either the AF configurations or the local configuration of the PCF 114, the PCF 114 can enabled URLLC for the PDU-SETs identified as critical above.

According to some examples, the method 400 includes sending, from the SMF 112 to the UPF 106, modifications of the PDU-SET filters, the modifications depending on the received PCC policies, at step 414. For example, the SMF 112 can send Packet Detection rules to the UPF 106.

According to some examples, the method 400 includes sending, from the SMF to the AMF and then via N2 to the gNB, the QoS policies, including the PDU-SET filters, at step 416.

In FIG. 5B, method 400 continues with step 418.

According to some examples, the method 400 includes receiving the PDU-SET sent from a content server to the UPF 106, the received data packets comprising the PDUs, at step 418. Step 418 can be essentially identical to step 216.

According to some examples, the method includes marking headers according to which of the PDU-SETs are URLLC enabled, at step 420. Similar to step 218, the UPF 106 identifies which of the received download (DL) packets at the UPF 106 belongs to the same set (e.g., PDU-SET). The UPF 106 uses one or more filters to identify which received packets are critical (e.g., PDU-SETs indicated as being URLLC enabled by information in an RTP header). Unlike step 218, the UPF 106 does not duplicate any of the PDUs at this point, but instead marks them (e.g., setting an indicator or flag in the GTP-U header). For example, upon identifying which PDU-SETS are critical or require a higher level of reliability, the UPF 106 can mark the respective PDUs by enabling in the GTP-U Header a URLLC indicator flag (URLLC-Ind) in all the PDUs that are part of the identified PDU-SET.

According to some examples, the method 400 includes sending, via the N3 interface, marked data packets, at step 422.

According to some examples, at step 424, the method 400 includes that the master gNB (MgNB) 120 uses the PDU-SET filters to detect which PDUs are URLLC enabled.

According to some examples, the method 400 includes establishing additional signaling between MgNB 120 and SgNB 124, at step 426. For example, when MgNB 120 finds that any of the PDUs are URLLC enabled, the MgNB 120 sets up a connection with the secondary gNodeB (SgNB) 124.

According to some examples, the method 400 includes sending, from MgNB 120 to SgNB 124, duplicates of PDUs for those data packets that are determined to be URLLC enabled, at step 428. For example, all PDUs that have been marked as URLLC enabled will be duplicated by MgNB 120 and forwarded to the SgNB 124.

According to some examples, the method 400 includes sending all PDUs (whether or not they are URLLC enabled) from MgNB 120 to UE 102, at step 430.

According to some examples, the method 400 includes sending the duplicate PDUs from SgNB 124 to UE 102, at step 432.

According to some examples, the method includes removing redundant PDUs received at the UE 102, at step 434. For example, the UE 102 may have a frame replication and elimination for reliability (FRER) feature enabled to eliminate redundant packets.

FIG. 6 illustrates an example method 600. Method 600 provides another non-limiting example of selectively increasing for specified data packets the reliability of transmissions from the gNB to the UE 102. For example, reliability is increased by using an acknowledgement mode when sending the PDUs of PDU-SETs that are URLLC enabled Thus, if a PDU of a URLLC enabled PDU-SET is lost, the UE will send an NACK message, indicating that the PDU should be resent. The network 100 illustrated in FIG. 1A may be used to implement method 600, for example. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 400 includes registering the UE with AMF at step 602. Step 602 can be essentially identical to step 202 and/or step 402.

According to some examples, the method 600 includes establishing a PDU session between the UE and SMF at step 604. Step 604 can be essentially identical to step 204 and/or step 404.

According to some examples, the method includes transmitting PCC rules via N7 at step 606. Step 606 can be essentially identical to step 206 and/or step 406.

According to some examples, the method 600 includes sending PDU-SET filters from the AF to the SMF at step 608. Step 608 can be essentially identical to step 208 and/or step 408.

According to some examples, the method 600 includes communicating the QoS policies between AF 116 and the PCF 114, at step 610. Step 610 can be essentially identical to step 210 and/or step 410.

According to some examples, the method 600 includes sending PCC policies via N7 at step 612. Step 612 can be essentially identical to step 212 and/or step 412.

According to some examples, the method 600 includes sending modifications from the SMF 112 to the UPF 106, at step 614. Step 614 can be essentially identical to step 214 and/or step 414.

According to some examples, the method 600 includes sending QoS policies to the AMF and then via N2 to the gNB at step 616. Step 616 can be essentially identical to step 416, except the QoS policies may be different. For example, in step 614 the QoS policies can relate to enabling an acknowledgement mode for URLLC enabled PDUs, whereas for step 416 the QoS policies can relate to e increasing redundancy of PDUs for which URLLC is enabled.

According to some examples, the method 600 includes sending PDU-SET via N6 from a content server to the UPF at step 618. Step 618 can be essentially be identical to a combination of step 418 and step 420.

According to some examples, the method 600 includes sending, via the N3 interface, all PDUs from the UPF 106 to the gNB 104, at step 620. Step 620 can be essentially be identical to step 422.

According to some examples, step 622 of the method 600 includes the gNB 104 detecting which of the PDU-SETs are URLLC enabled. Step 622 can be essentially be identical to step 424.

According to some examples, step 624 of the method 600 includes, for PDU-SETs that are determined to be URLLC enabled, using an acknowledgement mode to send the PDUs to the UE 102, whereas for all others PDUs (i.e., PDU-SETs that are not marked as being URLLC enabled) the PDUs are transmitted from the gNB using a different mode than the acknowledgement mode.

Figure 7:
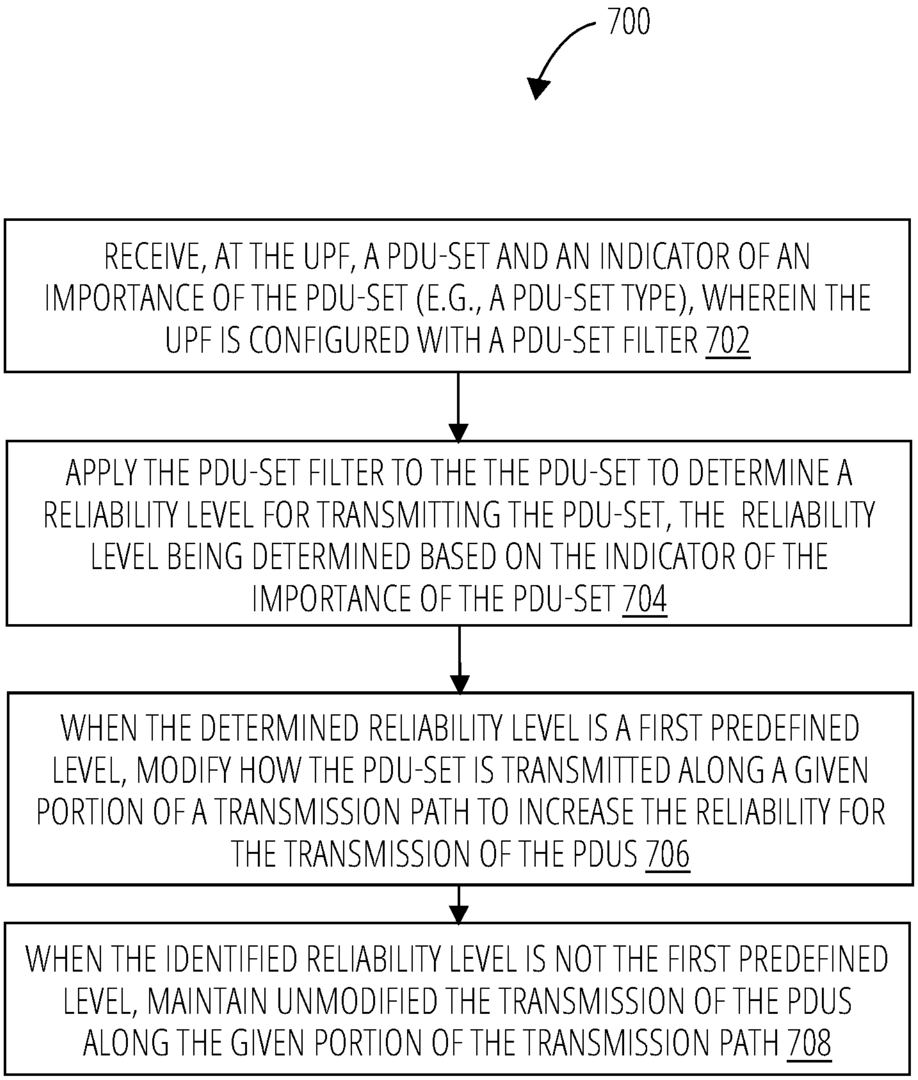
FIG. 7 illustrates an example of a flow diagram of method 700, in accordance with one embodiment.

FIG. 7 illustrates a flow diagram of a non-limiting example of method 700, which provides a general description of common aspects of method 200, method 400, and method 600. For example, method 700 provides a general technique of selectively increasing reliability of transmission in network 100 for select data packets that are indicated as being more important or critical relative to other data packets. These select data packets may be, for example PDU-SETs that, based on information in RTP headers or payload (e.g., NAL) headers, are identified for a higher reliability level for their transmission through one or more legs of the data plane of network 100. Then, detection and/or identification of critical PDU-SETs can be performed based on extended RTP header and IP headers to characterize boundaries of PDU-SETs and the relative importance of the respective PDU-SETs.

According to certain non-limiting examples, the AF 116 and/or 5GC may have connectivity through network exposure functionality. The AF 116 can have rules about PDU-SET identifications and can have policies about how the 5GC should handle different PDU-SETs. Accordingly, AF 116 shall configure rules in the 5GC for identification and treatment of PDU-SETs through interaction with the SMF 112 and PCF 114. An example framework for the AF 116 communicating with 5GC is provided in 3GPP specifications.

In step 702, method 700 receives, at a user plane function (UPF) 106, a protocol data unit set (PDU-SET) comprising protocol data units (PDUs) and a PDU-SET type indicating. The UPF 106 has one or more PDU-SET filters that are used to identify (e.g., based on one or more headers of the PDUs) which of the PDU-SETs are important or critical (e.g., PDU-SETs for which URLLC is enabled).

In step 704 of method 700, the PDU-SET are filtered using the PDU-SET filters to determine respective reliability levels corresponding to the PDU-SETs. This filtering can be performed, e.g., by applying the PDU-SET type to the PDU-SET filter.

In step 706 of method 700, rules are applied for the transmission of the PDUs based in the determined reliability level. When the determined reliability level is a first predefined level (i.e., a high reliability level), the reliability is increased for transmission of a given PDU by modifying how transmission is performed along a given portion/leg of the transmission path (e.g., along one or more legs between the UPF 106 and the UE 102). Examples of modifications for the transmission can include increasing redundancy of the select data packets that are determined to be critical or using an acknowledgement mode for the select data packets that are determined to be critical (e.g., PDUs that are URLCC enabled), thereby increasing the reliability for sending the PDUs of the select data packets along the given portion/leg of the transmission path.

In step 708, method 700 when the identified reliability level is not the first predefined level, the reliability can be maintained at its original/base level of reliability for all portions of the transmission path, thereby achieving unchanged transmission reliability for the data packets that are not indicated to require a heightened reliability level.

Figure 8:
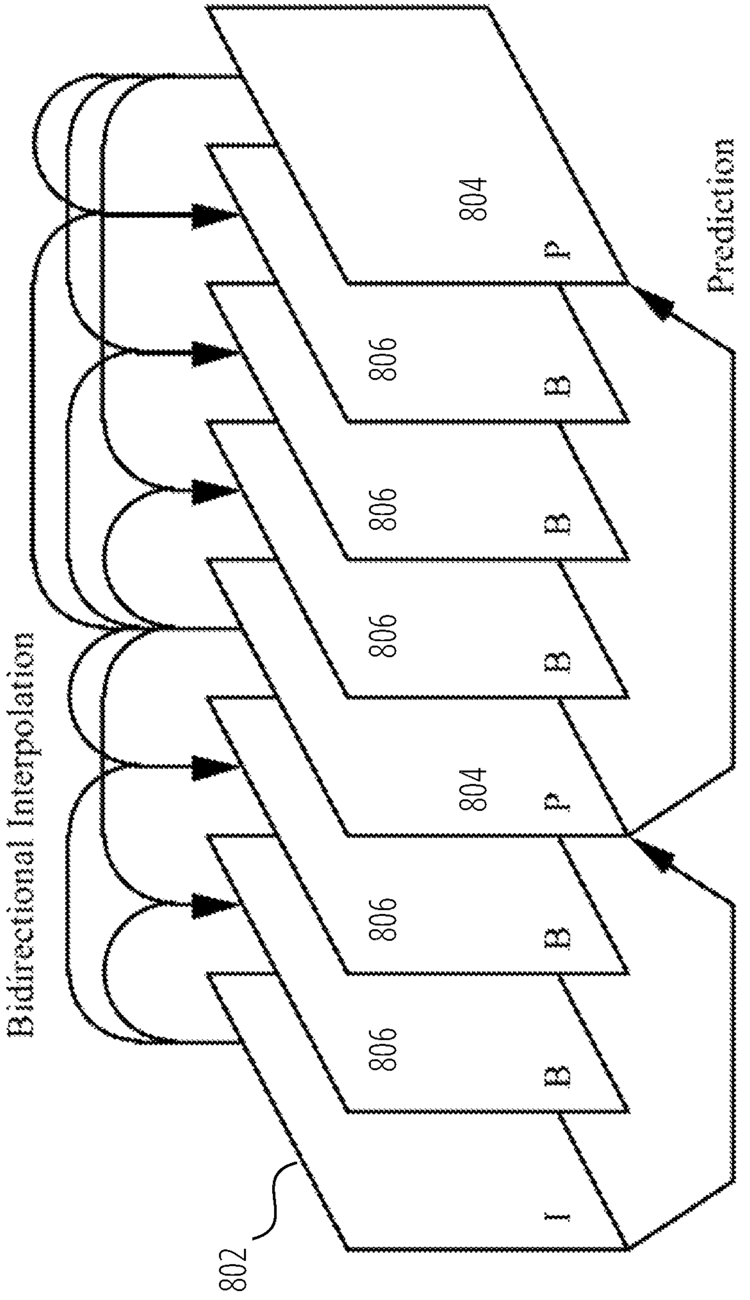
FIG. 8 illustrates an example of frames for video data, in accordance with one embodiment.

FIG. 8 illustrates an example of video data that can be packetized and sent across a network 100 from a content server 118 to a UE 102. More particular, FIG. 8 illustrates video streaming data, such as video data generated according to the MPEG-2 standard or another video encoding standard (e.g., H.261, H.263, H.264, MPEG-4, etc.).

FIG. 8 illustrates three picture or frame types. Intra coded frames (I-frames) 802 are coded without reference to other frames. The I-frames 802 provide access points to the coded sequence where decoding can begin, but are coded with only moderate compression. Predictive coded frames (P-frames) 804 are coded more efficiently using motion compensated prediction from a past intra or predictive coded picture and are generally used as a reference for further prediction. Bidirectionally-predictive coded frames (B-frames) 806 are never used as references for prediction. FIG. 8 illustrates the relationship among the three different frame types.

According to one non-limiting example, coded video data is an ordered set of video bitstreams. For example, in MPEG-2, the highest syntactic structure of the coded video bitstream is the video sequence. A video sequence commences with a sequence header which may optionally be followed by a group of pictures header and then by one or more coded frames. A header is a block of data in the coded bitstream containing the coded representation of a number of data elements pertaining to the coded data that follow the header in the bitstream. The video bitstream may include a hierarchy in which a group of pictures includes multiple frames, each frame includes multiple slices, and each slice includes multiple macroblocks. Each level of this hierarchy can have its own category of headers (e.g., slice headers, macroblock headers, etc.). These headers may include indicators or flags representing the type frame being encoded (i.e., whether the encoded video data following the header is for an I-frame 802, a P-frame 804, or a B-frame 806). If the indicators or flags in the headers were available when routing the packetized video bitstream through the network 100, then the indicators or flags in the headers might be used make decisions about a desired reliability level for the transmission of the respective frames through the network 100. However, when the video bitstream is packetized to be sent across the network 100, the information in these headers is not available for making decisions regarding the reliability level.

Figure 9:
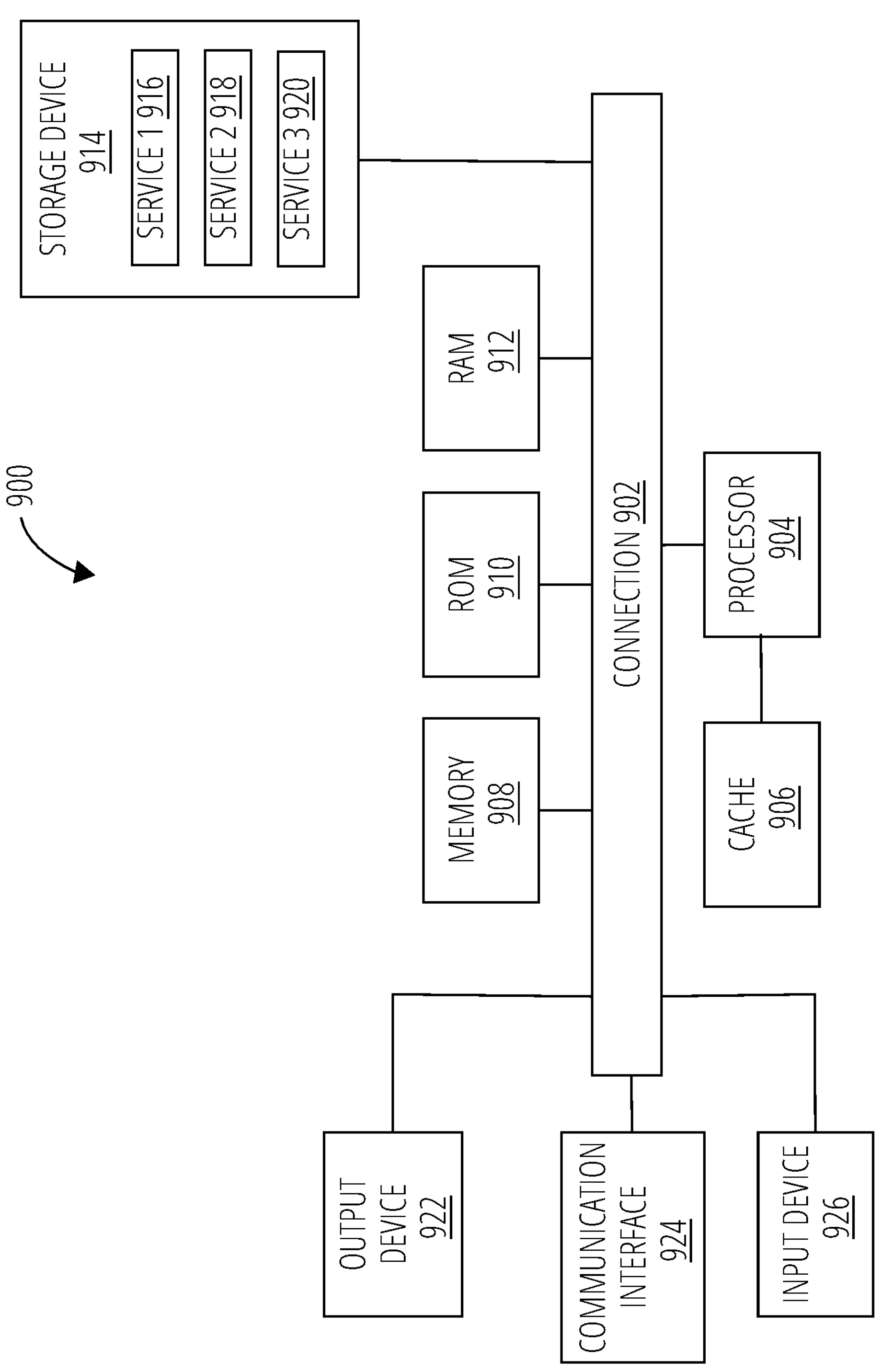
FIG. 9 illustrates an example of a block diagram of a computing system, in accordance with one embodiment.

FIG. 9 shows an example of computing system 900 that can execute one or more steps of any one of the methods disclosed herein. For example, the computing system 900 can be any computing device or any component thereof in which the components of the system are in communication with each other using connection 902. Connection 902 can be a physical connection via a bus, or a direct connection into processor 904, such as in a chipset architecture. Connection 902 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 904 and connection 902 that couples various system components including system memory 908, such as read only memory (ROM) 910 and random access memory (RAM) 912 to processor 904. Computing system 900 can include a cache of high-speed memory 906 connected directly with, in close proximity to, or integrated as part of processor 904.

Processor 904 can include any general purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communications interface 924, which can generally govern and manage the user input and system output. There is no restriction on operating on any particular hardware arrangement and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

receiving, at a user plane function (UPF), a protocol data unit set (PDU-SET) comprising protocol data units (PDUs) and an indicator of an importance of the PDU-SET, wherein the UPF stores a PDU-SET filter;

applying the PDU-SET filter to the PDU-SET to determine a reliability level for transmitting the PDU-SET based on the indicator of the importance of the PDU-SET and whether the PDU-SET is enabled for ultra-reliable low latency communications (URLLC) as indicated by information in a real-time transport protocol (RTP) header of at least one of the PDUs;

when the determined reliability level is a first predefined level, modifying how the PDU-SET is transmitted along a given portion of a transmission path from the UPF to a user equipment (UE) to increase a reliability for the transmission of the PDUs of the PDU-SET along the given portion; and when the determined reliability level is not the first predefined level, maintaining unmodified the given portion of the transmission path for the transmission of the PDUs of the PDU-SET along the given portion, wherein quality of service (QoS) policies for PDU-SETs are exchanged between an application function (AF) and a policy control function (PCF), the QoS policies being based on PDU-SET types of respective PDU-SETs and on whether respective PDU-SETs are enabled for the URLLC;

policy and charging control (PCC) policies are determined based on the QoS policies, the PCC policies including rules conditioned on the PDU-SET types of the respective PDU-SETs and on whether the respective PDU-SETs are enabled for URLLC, and the reliability level of the PDU-SET is determined based at least on the PDU-SET filter and the PCC policies.

2. The method of claim 1, wherein when the determined reliability level is the first predefined level, increasing the reliability for the transmission of the PDUs of the PDU-SET along the given portion includes using an acknowledgement mode when transmitting the PDUs of the PDU-SET from a radio access network (RAN) to the UE.

3. The method of claim 2, wherein using the acknowledgement mode when transmitting the PDUs further includes that the acknowledgement mode is an acknowledged mode (AM) applied in a radio link control (RLC) protocol applied to transmit the PDUs from a next generation nodeB (gNB), which is the RAN, to the UE.

4. The method of claim 3, wherein when the determined reliability level is not the first predefined level, the maintaining unmodified the given portion of the transmission path further includes transmitting the PDUs from the gNB to the UE using, in the RLC protocol, either an unacknowledged mode (UM) or a transparent mode (TM).

5. The method of claim 1, wherein when the determined reliability level is the first predefined level, the modifying how the PDU-SET is transmitted to increase the reliability for the transmission of the PDUs further includes increasing a redundancy of the PDUs sent over the given portion of the transmission path.

6. The method of claim 5, wherein, when the given portion of the transmission path includes transmissions from a next generation nodeB (gNB) to the UE, the redundancy of the PDUs transmitted from the gNB to the UE is increased by:

transmitting the PDUs received at the gNB from the gNB to the UE, transmitting, from the gNB to another gNB, duplicates of the PDUs received at the gNB, and transmitting the duplicates of the PDUs from the another gNB to the UE; and when the determined reliability level is not the first predefined level, the PDUs of the PDU-SET are transmitted from the gNB to the UE and no duplicates of the PDUs are transmitted to the another gNB.

7. The method of claim 5, further comprising, when more than one copy of the PDUs is transmitted and received for the given portion of the transmission path, eliminating duplicated copies of the received PDUs to reduce a number of copies to one per PDU.

8. The method of claim 5, wherein, when the given portion of the transmission path includes transmissions from the UPF to a next generation nodeB (gNB), the redundancy of the PDUs sent from the UPF to the gNB is increased by:

duplicating the PDUs received at the UPF, and transmitting, to the gNB, both the PDUs received at the UPF and the duplicated PDUs.

9. The method of claim 1, further comprising:

registering the UE with an access and mobility management function (AMF);

establishing a PDU session between the UE and a session management function (SMF);

sending, from the application function (AF) to the SMF, the PDU-SET filters used for identifying PDU-SETs, the PDU-SET filters including settings for identifying reliability levels assigned to respective PDU-SETs;

sending, from the SMF to the UPF, modifications of the PDU-SET filters, the modifications depending on the PCC policies at the SMF;

receiving, at the UPF, the PDU-SETs sent from a content server; and detecting, based on the PDU-SET filters, which of the PDU-SETs are URLLC enabled.

10. The method of claim 1, further comprising:

marking the PDUs of the PDU-SET that are URLLC enabled with a reliability level that is the first predefined level.

11. A computing system comprising:

one or more processors; and a memory storing instructions that, when executed by the one or more processors, cause the one or more processors to:

receive, at a user plane function (UPF), a protocol data unit set (PDU-SET) comprising protocol data units (PDUs) and an indicator of an importance of the PDU-SET, wherein the UPF stores a PDU-SET filter;

apply the PDU-SET filter to the PDU-SET to determine a reliability level for transmitting the PDU-SET based on the indicator of the importance of the PDU-SET and whether the PDU-SET is enabled for ultra-reliable low latency communications (URLLC) as indicated by information in a real-time transport protocol (RTP) header of at least one of the PDUs;

when the determined reliability level is a first predefined level, modify how the PDU-SET is transmitted along a given portion of a transmission path from the UPF to a user equipment (UE) to increase reliability for the transmission of the PDUs of the PDU-SET along the given portion; and when the determined reliability level is not the first predefined level, maintain unmodified the given portion of the transmission path for the transmission of the PDUs of the PDU-SET along the given portion, wherein quality of service (QoS) policies for PDU-SETs are exchanged between an application function (AF) and a policy control function (PCF), the QoS policies being based on PDU-SET types of respective PDU-SETs and on whether respective PDU-SETs are enabled for the URLLC;

policy and charging control (PCC) policies are determined based on the QoS policies, the PCC policies including rules conditioned on the PDU-SET types of the respective PDU-SETs and on whether the respective PDU-SETs are enabled for URLLC, and the reliability level of the PDU-SET is determined based at least on the PDU-SET filter and the PCC policies.

12. The computing system of claim 11, wherein, when the determined reliability level is the first predefined level, the instructions cause the one or more processors to increase the reliability for the transmission of the PDUs of the PDU-SET along the given portion by using an acknowledgement mode when transmitting the PDUs of the PDU-SET from a radio access network (RAN) to the UE.

13. The computing system of claim 12, wherein using the acknowledgement mode when transmitting the PDUs further includes that the acknowledgement mode is an acknowledged mode (AM) applied in a radio link control (RLC) protocol applied to transmit the PDUs from a next generation nodeB (gNB), which is the RAN, to the UE, and when the determined reliability level is not the first predefined level, the instructions cause the one or more processors to maintain unmodified the given portion of the transmission path by transmitting the PDUs from the gNB to the UE using, in the RLC protocol, either an unacknowledged mode (UM) or a transparent mode (TM).

14. The computing system of claim 11, wherein, when the determined reliability level is the first predefined level, the instructions cause the one or more processors to modify how the PDU-SET is transmitted to increase the reliability for the transmission of the PDUs by increasing a redundancy of the PDUs sent over the given portion of the transmission path.

15. The computing system of claim 14, wherein, when the given portion of the transmission path includes transmissions from a next generation nodeB (gNB) to the UE, the instructions cause the one or more processors to increase the redundancy of the PDUs transmitted from the gNb to the UE by:

transmitting the PDUs received at the gNb from the gNB to the UE, transmitting, from the gNB to another gNB, duplicates of the PDUs received at the gNB, and transmitting the duplicates of the PDUs from the another gNB to the UE; and, when the determined reliability level is not the first predefined level, the instructions cause the one or more processors to transmit the PDUs of the PDU-SET from the gNb to the UE without duplicating and transmitting the PDUs to the another gNB.

16. The computing system of claim 14, wherein, when the given portion of the transmission path includes transmissions from the UPF to a next generation nodeB (gNB), the instructions cause the one or more processors to increase the redundancy of the PDUs sent from the UPF to the gNB by:

duplicating the PDUs received at the UPF, and transmitting, to the gNB, both the PDUs received at the UPF and the duplicated PDUs.

17. A network system, comprising:

a content server configured to transmit a protocol data unit set (PDU-SET) comprising protocol data units (PDUs) and an indicator of an importance of the PDU-SET; and a user plane function (UPF) configured to, receive the PDU-SET from the content server, and apply a PDU-SET filter to the PDU-SET to determine a reliability level for transmitting the PDU-SET based on the indicator of the importance of the PDU-SET and whether the PDU-SET is enabled for ultra-reliable low latency communications (URLLC) as indicated by information in a real-time transport protocol (RTP) header of at least one of the PDUs; and a user equipment configured to receive the PDU-SET after the PDU-SET is transmitted from the UPF, wherein, when the determined reliability level is a first predefined level, a given portion of a transmission path from the UPF to the user equipment (UE) is modified with respect to how the PDU-SET is transmitted along the given portion, and modification to the given portion increases a reliability for the transmission of the PDUs of the PDU-SET along the given portion; and when the determined reliability level is not the first predefined level, the transmission of the PDUs of the PDU-SET along the given portion is maintained unmodified, wherein quality of service (QoS) policies for PDU-SETs are exchanged between an application function (AF) and a policy control function (PCF), the QoS policies being based on PDU-SET types of respective PDU-SETs and on whether respective PDU-SETs are enabled for the URLLC;

policy and charging control (PCC) policies are determined based on the QoS policies, the PCC policies including rules conditioned on the PDU-SET types of the respective PDU-SETs and on whether the respective PDU-SETs are enabled for URLLC, and the reliability level of the PDU-SET is determined based at least on the PDU-SET filter and the PCC policies.

18. The network system of claim 17, wherein when the determined reliability level is the first predefined level, the UPF increases the reliability for the transmission of the PDUs of the PDU-SET along the given portion by signaling the network system to use an acknowledgement mode when transmitting the PDUs of the PDU-SET from a radio access network (RAN) to the UE.

19. The network system of claim 17, wherein when the determined reliability level is the first predefined level, the UPF increases the reliability for the transmission of the PDUs of the PDU-SET along the given portion by signaling the network system to increase a redundancy of the PDUs sent over the given portion of the transmission path.

20. The network system of claim 17, further comprising:

an access and mobility management function (AMF); and a session management function (SMF);

wherein the network system is further configured to:

register the UE with the AMF, establish a PDU session between the UE and the SMF, send, from the PCF to the SMF, the PCC policies that are based on the QoS policies, the PCC policies including rules that are conditioned on the PDU-SET types of the respective PDU-SETs and on whether the respective PDU-SETs are enabled for the URLLC, send, from the SMF to the UPF, modifications of the PDU-SET filters, the modifications depending on the PCC policies at the SMF, receive, at the UPF, the PDU-SETs sent from a content server, and detect, based on the PDU-SET filters, which of the PDU-SETs are URLLC enabled.

* * * * *